Sept. 13, 1966  E. G. THIELE ETAL  3,272,331
WIENER ORIENTER
Filed Sept. 24, 1963  5 Sheets-Sheet 1
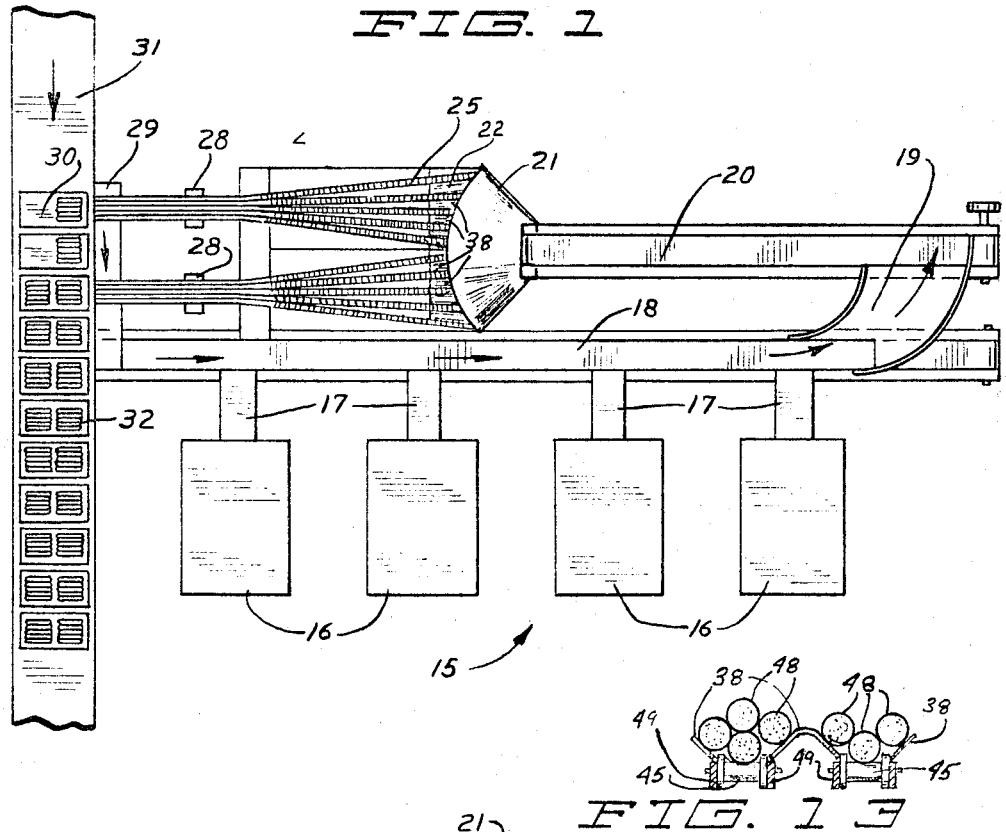
FIG. 1
FIG. 13
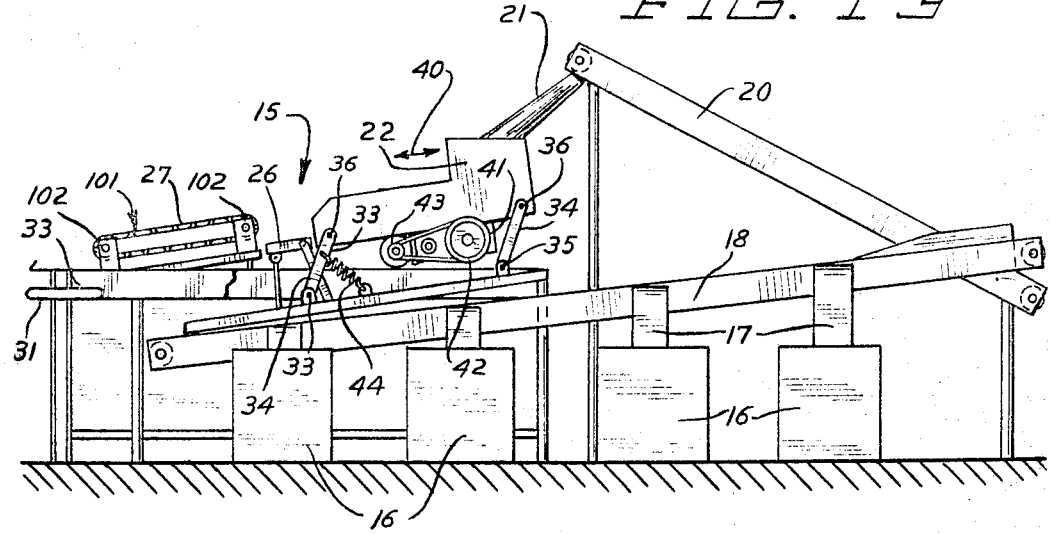
FIG. 2
INVENTORS
EDWARD G. THIELE
BY RALPH D. BURGESS
ATTORNEYS

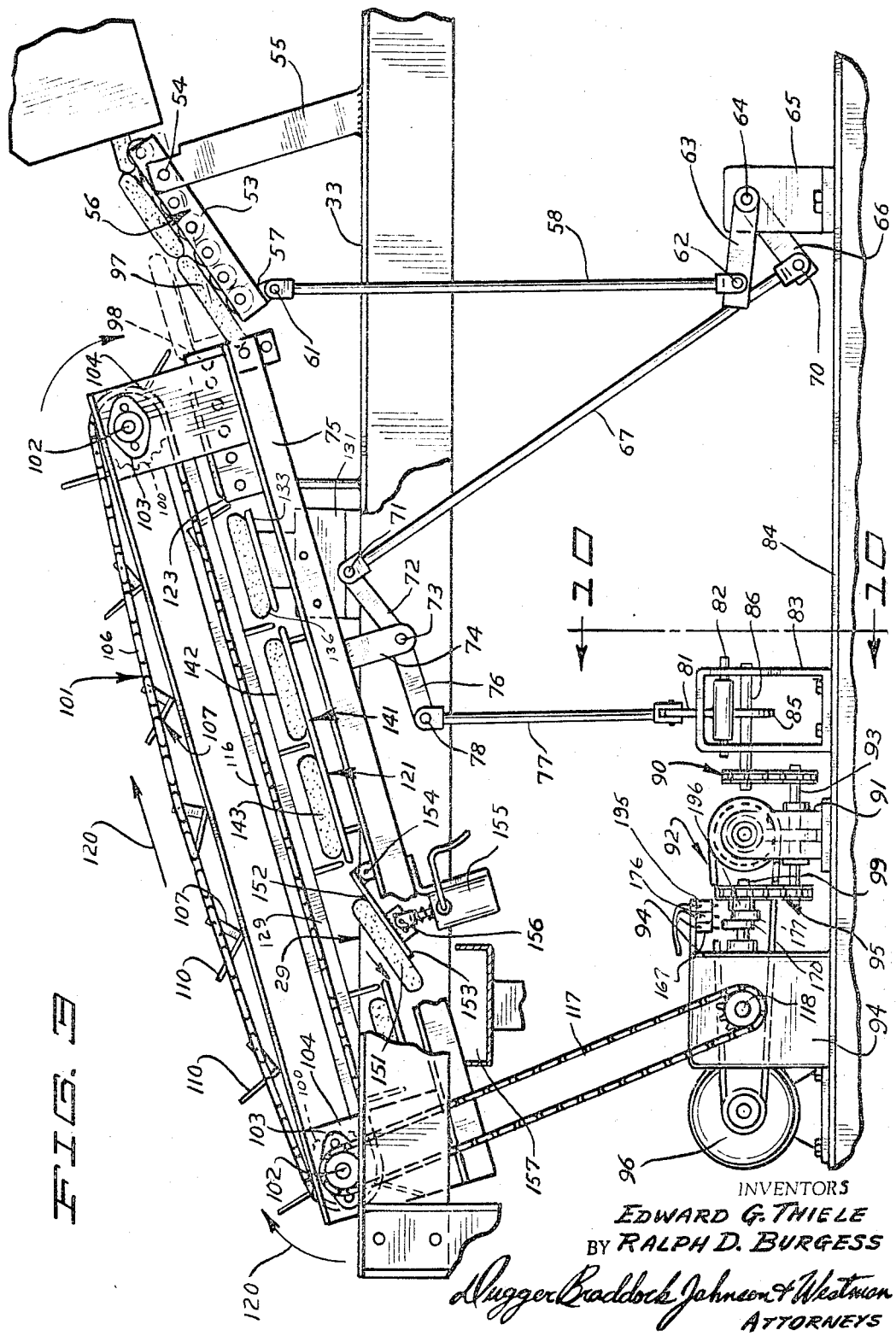

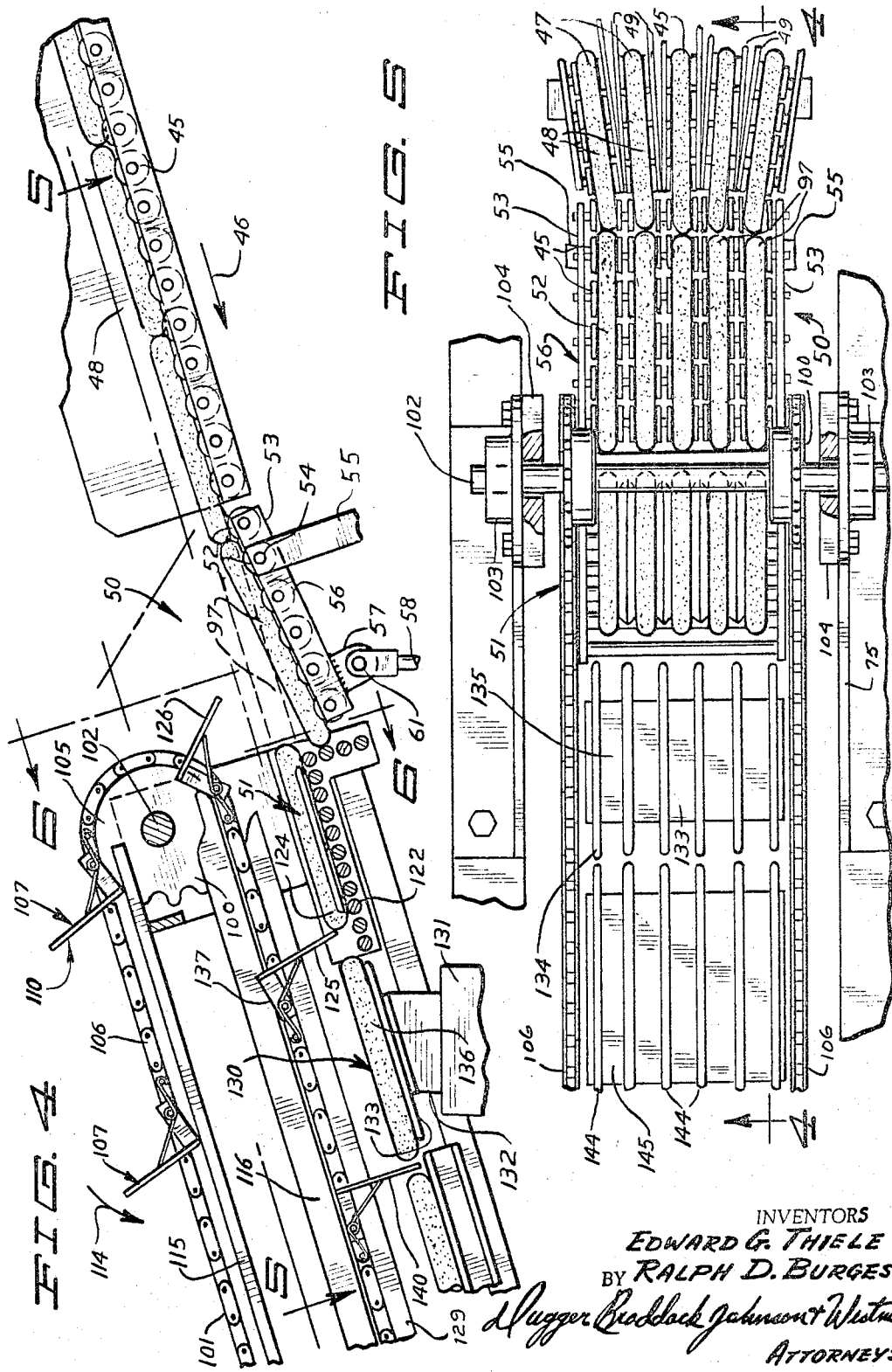

Sept. 13, 1966   E. G. THIELE ETAL   3,272,331
WIENER ORIENTER
Filed Sept. 24, 1963   5 Sheets-Sheet 4
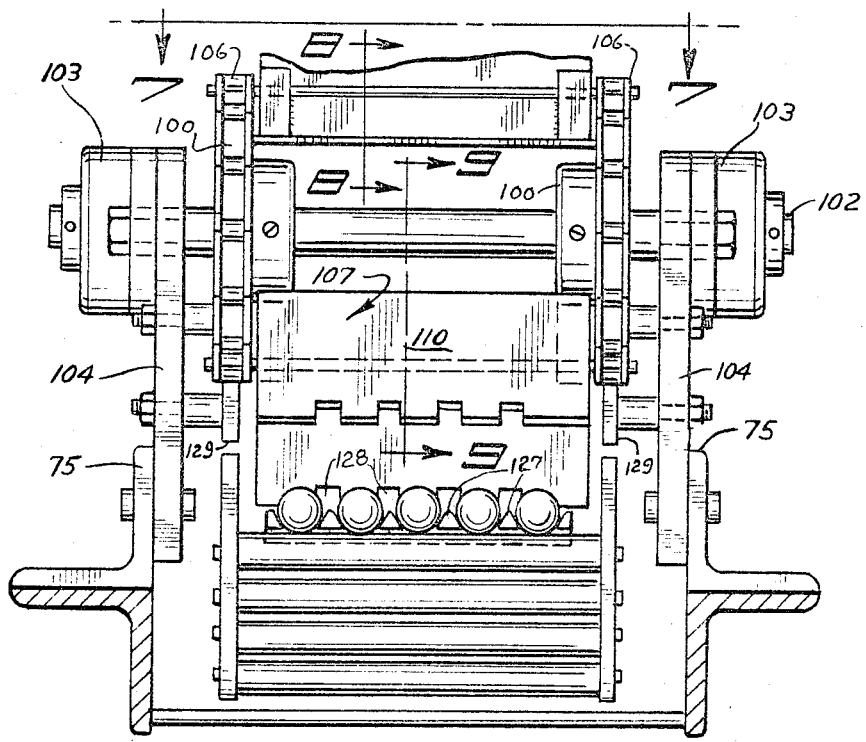
FIG. 6
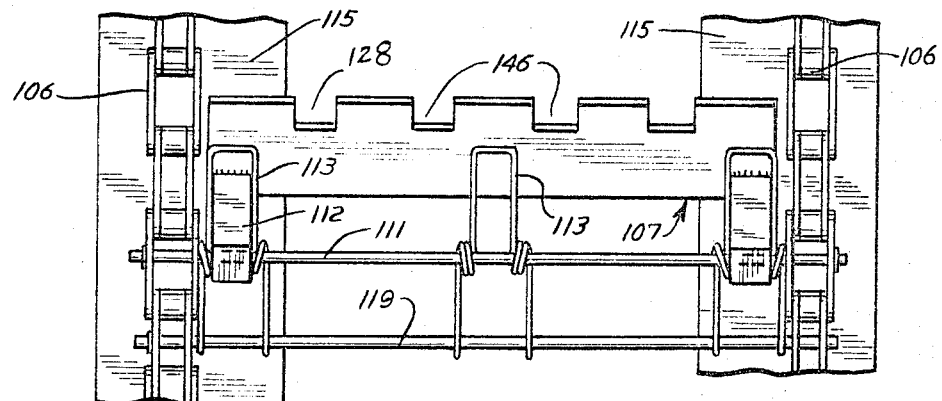
FIG. 7
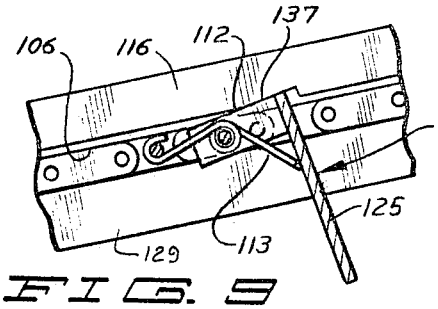
FIG. 9
FIG. 8
INVENTORS
EDWARD G. THIELE
RALPH D. BURGESS
BY
Dugger Braddock Johnson & Westman
ATTORNEYS Sept. 13, 1966  E. G. THIELE ETAL  3,272,331
WIENER ORIENTER Filed Sept. 24, 1963  5 Sheets-Sheet 5

INVENTORS
EDWARD G. THIELE
BY RALPH D. BURGESS
Dugger Braddock Johnson & Westman
ATTORNEYS

3,272,331
WIENER ORIENTER

Edward G. Thiele and Ralph D. Burgess, Minneapolis, Minn., assignor, by mesne assignments, to Champion Papers, Inc., Hamilton, Ohio, a corporation of Ohio
Filed Sept. 24, 1963, Ser. No. 310,995
20 Claims. (Cl. 209—74)

The present invention has relation to packaging machinery and more particularly to machinery to position wieners in transversely aligned groups of five, weigh them, reject underweight or overweight groups and place the groups of wieners of correct weight in position to be packaged.

The handling of wieners has long been a problem because of the difficulty in handling them in automated packaging machinery. The biggest problem is to get five wieners in a group side-by-side and perfectly aligned and only further process groups which are within the allowable weight variations.

Another problem in handling wieners has been that it has been difficult to get them oriented properly so that they are all longitudinally extending with respect to the direction of movement and then aligning the wieners into the individual groups necessary for packaging.

The machine of the present invention, in the form disclosed, illustrates an orienter for wieners which receives wieners from a bulk conveyor, aligns them to be properly oriented so that they are longitudinally extending with respect to the direction of movement, and also segregates them into groups of five, automatically weighs each group and rejects or accepts the group, depending upon the weight, and delivers the group of five onto a packaging table where they are packaged.

The machine greatly speeds up the processing of wieners from the bulk stages to final product, and accomplishes this without hand labor.

It is an object of the present invention to present an improved automatic wiener orienter.

It is a further object of the present invention to present a wiener orienter which does not require manual labor.

It is still a further object of the present invention to present a wiener orienter wherein individual groups of wieners are automatically weighed and rejected if underweight or overweight.

Other and further objects are those inherent in the invention herein illustrated, described, and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

In the drawings:

FIG. 1 is a top plan view of a wiener processing station utilizing a wiener orienter made according to the present invention;

FIG. 2 is a side elevational view of the device of FIG. 1;

FIG. 3 is a fragmentary enlarged side elevational view of a wiener orienter of the present invention;

FIG. 4 is a fragmentary enlarged side sectional view of an upper portion of the wiener orienter made according to the present invention and taken in the direction of the line 4—4 of FIG. 5;

FIG. 5 is a view taken on the line 5—5 of FIG. 4;

FIG. 6 is a sectional view taken as on line 6—6 of FIG. 4;

FIG. 7 is a framentary top plan view taken as on line 7—7 in FIG. 6;

FIG. 8 is a fragmentary sectional view taken as on line 8—8 in FIG. 6;

FIG. 9 is a fragmentary sectional view taken as on line 9—9 in FIG. 6;

FIG. 13 is a fragmentary enlarged sectional view of the upper end of the tracks in the hopper for the machine of the invention.

Figure 10:
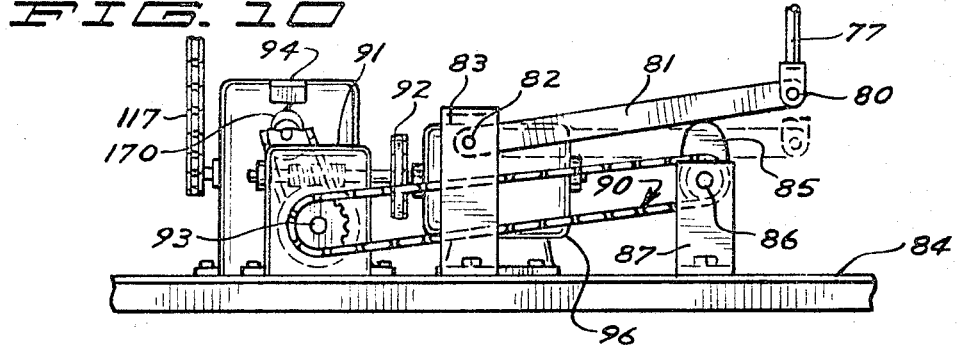
FIG. 10 is a fragmentary end elevational view of a drive mechanism taken as on line 10—10 in FIG. 3.

Referring to the drawings and the numerals of the reference thereon, a wiener processing station illustrated generally at 15 includes a plurality of wiener peelers 16 which have discharge chutes 17 which discharge peeled wieners onto a feed conveyor 18. The wieners are carried by feed conveyor 18 over a transition member 19 and then are discharged into a second elevating conveyor 20. The elevating conveyor 20 conveys the wieners upwardly and deposits them on a distribution chute 21 which is shaped as a frustrum of a cone and extends downwardly from the conveyor toward two wiener orienter hoppers 22. The chute 21 terminates above the bottom of the hopper 22. As shown there are two machines utilized for side-by-side operation and thus, two conveyors 22 are used. The chute 21 has a convex upper surface and as the wieners drop from the conveyors they fall at random onto the chute and then are deposited onto conveyors forming the hoppers at random. One orienter can be used, if desired. The wieners in the hopper are conveyed from the hoppers along conveyor tracks shown schematically at 25 into an indexing station 26, and thence into an indexing conveyor 27. The indexing conveyor 27 receives individual groups of five wieners each, as will be more fully explained later, and transfers them across a scale station 28 and downwardly to a reject station 29 or to the final processing station 30 on a carton feed conveyor belt 31.

As shown, five wieners are grouped together at the indexing conveyor and are deposited in the cartons at the station 30. As can be seen, the first unit of the wiener orienter deposits five wieners onto the carton and the conveyor belt 31 transfers them over to position wherein the second wiener orienting machine deposits a second group of five wieners into the same carton. Therefore, the wieners are packed in a carton of ten, as is conventionally done at the present time. The filled cartons are illustrated generally at 32.

The description will proceed using only one of the processing machines as an example. Both processing machines are alike.

Each of the hoppers 22 including the conveyor tracks is mounted onto a main frame 33 on parallel links 34, 34. The links 34, 34 are pivoted as at 35 to the main frame and as at 36 to the hopper 22. The hopper is vibrated in directions as indicated by double arrow 40 through the use of eccentrically mounted weights mounted in a housing 41 and driven through a sheave 42 that in turn is driven by a motor 43. As the ecentric weights are rotated, they set up vibrations and cause the hopper and conveyor tracks to move about the pivots of the links 34. A spring 44 is provided to urge the hopper into its normal position.

When wieners 48 are delivered from the distribution chute 21 into the hopper, they fall freely onto the upper end of the hopper. The wieners come into contact with suitable inverted V-shaped dividers 38 which orient the wieners in direction so that they fall onto one of five separate longitudinally converging tracks 47 and extend in longitudinal direction along the tracks. The dividers 38 extend only a short distance along the tracks. The tracks are spaced apart at the upper portions thereof and the dividers are positioned so that each joins two adjacent tracks. If the wieners pile up on the tracks to more than one deep the extra wieners will drop off between the tracks when they move downwardly past the dividers. A suitable chute or conveyor (not shown) is provided to move wieners dropping off the tracks back into the conveyor 18.

The tracks 47 are each comprised as a plurality of individually rotatably mounted rollers 45 arranged between spaced side frame members 49, 49 and positioned so that the outer surfaces thereof are adjacent and the axes thereof are parallel. The axes are transverse to the direction of movement of the wieners. The wieners 48 in the hopper, under the vibrating motion of the hopper, move downwardly in direction as indicated by arrow 46 in FIG. 4 on top of the rollers 45.

*Holding and alignment station*

The tracks 47 converge together from the upper end of the hopper downwardly to position adjacent a hold and aligning station illustrated at 50. The hold station is provided to permit a group of five wieners (which are delivered by the five tracks 47) on the conveyor to move to position clearing an indexing conveyor paddle as well as align the ends of the wieners on the station, which will be more fully explained later.

The hold station 50 also holds the wieners in the hopper so that they may be properly indexed and oriented at an indexing station 51.

As can be seen in FIG. 5, the hold station has five tracks 52 that align with and form extension of tracks 47. The tracks 52 in the hold station are also comprised of a plurality of rollers 45. The assembly of rollers 45 are mounted between a pair of hold station side members 53, 53 which in turn are pivotally mounted as at 54 to upright supports 55 extending from the frame 33. The side members 53, 53 are connected together with suitable structure to form a frame 56 for the rollers which is movable about its pivot as a unit. The movement of the frame 56 is controlled by external linkage so that the movement of the frame is timed in relation to the other functions of the machine.

An ear 57 is affixed to the hold station frame 56 and a first link 58 is pivotally mounted as at 61 to the ear. Link 58 extends downwardly from the frame 56 and is attached as at 62 to an arm 63 which in turn is attached to a jack shaft 64. The jack shaft 64 is rotatably mounted in a housing 65. A second arm 66 is attached to an opposite end of shaft 64, and a second link 67 is pivotally mounted as at 70 to the arm 66. The second link 67 extends upwardly, as shown in FIG. 3, and is attached as at 71 to a first end of a bell crank 72 that is pivotally mounted as at 73 to a bracket 74 attached to a frame 75 which in turn is mounted to main frame 33. A second end portion 76 of the bell crank 72 extends on the opposite side of pivot 73 from the connection 71 and an actuator link 77 is directly connected to the second end as at 78. The second end of the actuator link 77 is pivotally mounted as at 80 to a cam follower lever 81 which is pivotally mounted as at 82 to a bracket 83 mounted onto a base 84. The base 84 also mounts housing 65 and forms a portion of the main frame 33.

A cam 85 is mounted onto a shaft 86 which in turn is rotatably mounted in the bracket 87 that is mounted to base 84. The cam is drivably mounted on shaft 86 and the shaft in turn is driven through a chain and sprocket drive illustrated generally at 90 from an output shaft 93 of a gear reducer 91 which is also mounted to base 84. The gear reducer 91 is driven through a V-belt and pulley set 92 from an electric motor 96. A gear type indexer 94 has an input shaft 99 that is driven from shaft 93 of the gear reducer with a chain and sprocket 95.

When the motor 96 is running, it operates all of the functions of the indexing and holding stations of the orienter. As the units are run by shaft 93 and in turn with chain and sprockets, there is no danger of them getting out of time. This will be more fully explained later.

With the motor running, it can be seen that shaft 86 will be rotated through the power drive from the motor 96 through chain and sprocket set 92, gear reducer 91, output shaft 93 and chain and sprocket set 90. As the shaft rotates, the cam 85 will also rotate. In its high position, as illustrated in FIG. 10, the cam follower lever 81 will be raised. This in turn will act through the links 77, 67 and 58 to lower the hold station frame 56 to a position out of the plane of the tracks 47, as shown in FIGS. 3 and 4. In this lowered position, it will be seen that the group of wieners 97 (there will be five wieners across the station) are abutted against a plurality of substantially vertically disposed rollers 98 that are rotatably mounted about horizontal axes on the frame 75 of the indexing unit. The rollers 98 form a stop member to prevent the wieners 97 and the wieners 48 on the tracks 47 behind them from traveling forward into the indexing station 51. The ends of the wieners in group 97 are transversely aligned against the stop member formed by rollers 98. The wieners 97 are also moved clear of the indexing conveyor flights.

*Indexing and weighing station*

In the indexing station each of the groups of five wieners are separated from the others and carried as groups by paddles of a conveyor to be weighed and either moved to the packaging position or rejected.

The indexing conveyor 27 is utilized for keeping the groups of weiners separated and to move them toward the finished processing line. The conveyor is mounted on the side frames 75, 75 which are mounted on the main frame 33. The indexing conveyor chain assembly illustrated generally at 101 is mounted on and extends the length of the conveyor. The conveyor chain assembly is mounted on sprockets 100 that are drivably mounted on a pair of spaced shafts 102, 102 which in turn are rotatably mounted in suitable bearings 103, 103 positioned at opposite ends of the conveyor. The bearings 103 are mounted in brackets 104 which are mounted in turn to the side members 75.

A pair of endless chains 106, 106 are mounted over aligning pairs of sprockets 100 at opposite ends of the conveyor. A plurality of cross paddles, generally indicated at 107 are mounted between the chains 106, 106 and have pusher member portions 110 extending outwardly from the chain. The paddles are each pivotally mounted on one of a plurality of shafts 111 that extend between the chains 106, 106. The paddles are mounted to the shafts with suitable brackets 112. The pusher portions 110 are fixedly attached to the brackets 112.

A plurality of torsion springs 113 are mounted over each of the shafts 111 and the springs engage one of a plurality of stop shafts 119 that are attached to the chains 106, 106 and are positioned closely adjacent the shafts 111. Torsion springs 113 are positioned so that they urge the paddles 107 in direction as indicated by arrow 114. The paddles 107 ride against a return guide bar 115 at the top portion of the conveyor. The paddles ride against an upper guide bar 116 at the bottom of the conveyor. The guide bars prevent the paddles from going too far inwardly toward the center of the conveyor under urging of springs 113 and becoming inoperative. The reaction from the springs 113 is taken by lower guide bars 129, 129, which support the chains at the bottom portion of the conveyor.

The conveyor paddle and chain assembly is driven through a chain and sprocket set 117 that in turn is driven by an output shaft 118 of the indexing reducer 94. The chains 106, 106 move in direction as indicated by arrow 120.

The gear type indexer 94 is constructed so that with each revolution of the input shaft 99, a provided output shaft 118 will be rotated a sufficient amount so that the paddles on the indexing conveyor will have moved one station. Further, the indexer is constructed so that the moving of the paddles occurs rather rapidly and then the paddles remain stationary for the balance of the time that the input shaft 99 is completing one revolution. Therefore, the indexing conveyor has intermittent motion. The indexer unit 94 is commercially available and has internal mechanism suitable to accomplish the purpose.

The indexing conveyor has a bed or support illustrated generally at 121. The bed is comprised of many sections. The first section at the upper portion of the conveyor is the indexing station 51. The indexing station portion is comprised as a plurality of rotatably mounted shaft-like rollers 122 which are independently mounted between side members 123, 123 which in turn are mounted onto the members 75. The rotatably mounted rollers permit the wieners to easily roll across the section. The wieners are held separated by dividers 127 which are attached to the frame. The paddles 107 have a plurality of notches 128 in the outer edges thereof. The notches are provided so that the paddles clear the dividers between the individual wieners on the indexing station.

It is in this section where the paddles 107 first engage the groups of five wieners each that are to be packaged. It can be seen that when frame 56 is moved to its "up" position 20 that the support is in the same plane as the tracks 47, the wieners on the hold station will move forwardly and downwardly to the indexing station. With the indexing paddles 107 as shown in FIG. 4, a group of weiners 124 rolls across the rollers 122 and engages a paddle 125. In this position the conveyor chain stops momentarily under the action of the indexer 94. The group of wieners 124 is prevented from moving further downwardly on the indexing conveyor. The indexer and the hold station frame are timed so that the hold station frame will start moving downwardly into position as shown in FIG. 4. After the hold station has moved to its second or down position, the indexer will move the indexing conveyor one position, the chain moves a distance equal to the distance between the paddles, and paddle 126 will engage the group of wieners 124. The hold station frame has moved to position so the paddle 126 will clear the wieners on the frame when it moves.

The second station 28 on the indexing conveyor is a scale station. At this station each group of five wieners is weighed, and if it is either overweight or underweight, it is subsequently rejected. When the indexing conveyor is shifted the group of five wieners previously on the indexing station 51 will be shifted to the scale. The second station includes a scale unit 131 having a support 132 thereon. The support 132 has an upper platform 133. The upper platform 133 includes a plurality of longitudinally extending guide members 134 which are spaced apart an equal distance and provide tracks 135 for the wieners to slide along. The guide members 134 are not very large, but adjacent members provide receptacles so that the wieners are separated slightly and remain oriented so that they are parallel to each other. When the paddle 125 has pushed the group of wieners 136 so that they are positioned on the top of the scale, the paddle enters a provided notch 137 in the upper guide bar 116 and moves upwardly under the urging of the springs 113 into this notch. The paddle 125 thus moves away from the wieners on the scale. As the wieners do not slide readily down the provided track, they will remain centered on the scale and will not touch a forward one of the paddles 140.

Further, the paddle 125, as explained previously will hold the wieners 124 away from the wieners 136 on the scale and thus the wieners will be weighed entirely unsupported except by the scale. After the wieners have been weighed, the indexing conveyor will again start and the paddle 125 will engage the wieners 136 and move them down the conveyor. The cycle will repeat.

The next section of the conveyor, illustrated generally at 141, is comprised as a section which holds two groups of wieners 142 and 143, respectively. The section 141 is comprised of a plurality of longitudinally extending guide rods 144 which are aligned with the rods 134 on the scale. The receptacles 145 formed by these guide rods are also aligned with the receptacles 135 on the scale. The paddles 107 move the wieners along.

After the weiners have again moved, they come to a reject station 29. In this station a group of wieners 151 is placed onto a platform unit 152 which is comprised of a plurality of rods 153 aligned with the rods 144, the platform unit is hinged as at 154 to the frame 75. A solenoid controlled air cylinder 155 is used for controlling movement of the platform unit, and is connected thereto as at 156. The scale 131 transmits the proper signal through a memory circuit (which will be explained later) and to indicate if the wieners on the reject station are either overweight or underweight. If the wieners deviate from a preselected standard weight, a solenoid 155 will operate and the platform unit will tilt downwardly as shown in FIG. 3 and deposit the wieners 151 onto a return conveyor 157. The conveyor 157 will then discharge the wieners onto conveyor 18 and the wieners that are overweight or underweight will be recirculated. In passing through the conveyors, they will be intermixed with other wieners that are of different sizes, and by random selection eventually the correct weight for a group of five wieners will be reached.

If the wieners are of correct weight, the scale does not give a signal to the memory system and the air cylinder will not dump the wieners. The paddles 107 will move the group of correct weight wieners onwardly and out through the discharge unit end of the conveyor and onto the packaging station where the conveyor again indexes.

It can thus be seen that through the use of a vibrating conveyor for moving the wieners into five longitudinally aligned rows and making the wieners roll freely down the conveyor so that they abut against each other end-to-end, plus the use of an indexing conveyor, and scale-reject mechanism, accurate weight and automatic handling of wieners can be obtained. Of particular importance is the fact that when the wieners are weighed, they are not touched by other wieners or by the conveyor mechanism.

Figure 11:
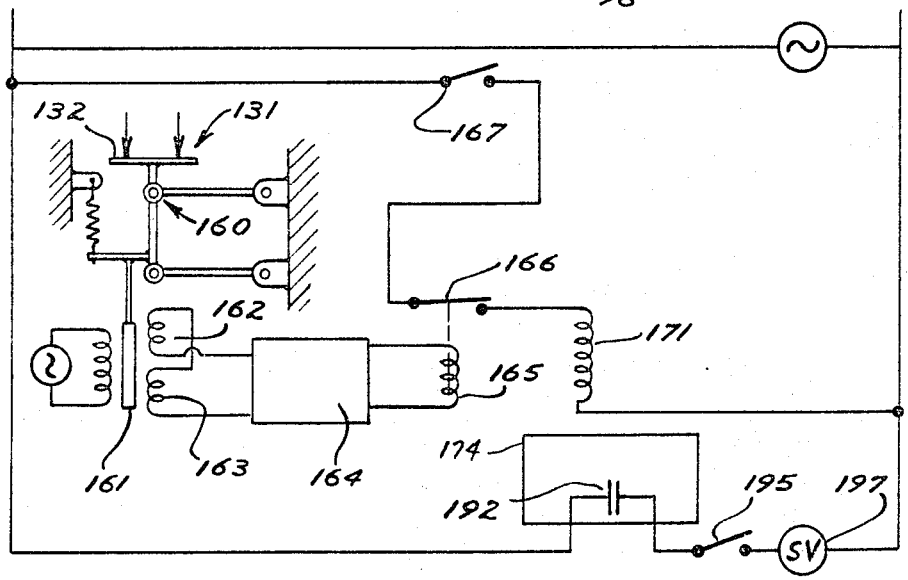
FIG. 11 is a schematic representation of the scale and memory circuit controlling the reject mechanism of the present invention.
Figure 12:
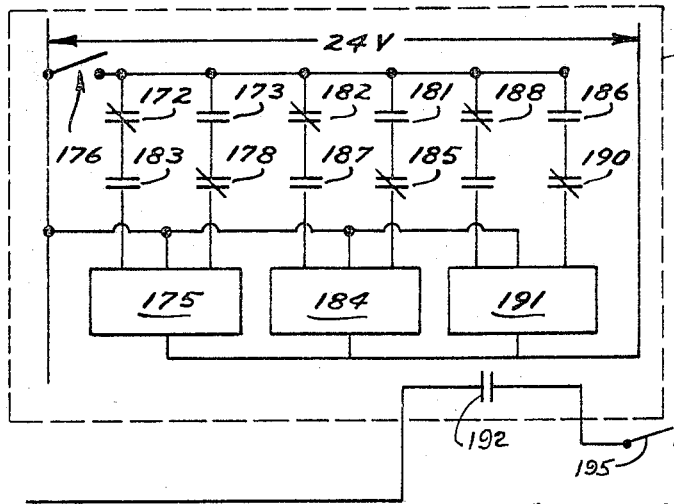
FIG. 12 is a further detailed schematic representation of a portion of the memory circuit used in the present invention.

The circuit utilized for weighing the wieners and the memory circuit for indicating to the reject mechanism whether the wiener should be retained or discharged is illustrated schematically in FIGS. 11 and 12. FIG. 11 is an overall schematic representation of the complete weighing discharge control circuit and FIG. 12 illustrates in slightly more detail the concept of the memory system.

The scale 131 includes the platform 132 on which a group of five wieners are resting. The platform 132 is connected through suitable linkage 160 to which an element 161 which will cause an electrical signal to pass through an underweight signal coil 162 or an overweight signal coil 163 whenever the wieners on support 132 are overweight or underweight. The signal from the coil (either overweight or underweight) is passed through an amplifier 164 and in turn is used to operate a relay coil 165 that controls a set of contacts 166 and closes them whenever a signal is present. Thus if the wieners are either overweight or underweight, contacts 166 are closed.

A micro-switch 167 is operated from a cam 170 on the input shaft to the indexing unit. The cam 170 operates the micro-switch 167 after the conveyor unit has indexed or moved to a new position, and the group of five wieners to be weighed is positioned on the support 132 and after the paddle engaging this group of wieners has moved into the notch 137 and is no longer contacting the wieners. A slight delay after indexing is utilized to permit the scale to settle.

The limit switch 167 is then closed and acts as a signal to weigh. I contacts 166 are closed (if the wieners are overweight or underweight), a coil 171 is energized through the lines shown schematically in FIG. 11. The coil 171 operates a pair of normally closed contacts 172 and a pair of normally open contacts 173. These contacts are illustrated schematically in FIG. 12. The contacts 172 and 173 are part of the circuitry in a shift register or memory unit 174. Energizing coil 171 and operating contacts 172 and 173 will be the first step in operating a first module 175 in the memory system.

Just before the unit again "indexes" so that the paddles move the groups of wieners one position down along the conveyor, a switch 176 is closed by a cam 177 that is also on the input shaft 99 of the indexer 94. When the switch 176 is closed an electric pulse signal is received by the shift register (FIG. 12) and signals that the unit is about to move the group of wieners on the scale to its next position. When this signal appears (switch 176 closes), if the coil 171 has been energized because the wieners on the scale are either overweight or underweight, the electrical signal will go through the normally open contact 173 (which will be closed) and through a set of normally closed contacts 178 which are part of the "set" circuit for module 175. Suitable coils within module 175 are energized which control normally open contacts 181 and 183 and normally closed contacts 182 as shown schematically in FIG. 12. An internal latch circuit will hold this coil in position until the conveyor unit once again shifts and closes switch 176. After a single shift the group of wieners that are overweight or underweight will now be one position away from the scale at position 142 and the contact 181 will be closed. Contacts 181 control the "set" side of a second module 184 in the shift register memory circuit.

When the input shaft for the indexer again has rotated to position, limit switch 176 will again be closed by cam 177 and, neglecting the other components of the memory circuit, the electrical signal caused when limit switch 176 is closed will pass through contacts 181 (which are "set" or closed) and a set of normally closed contacts 185. The signal then will energize suitable coils within second module 184 which will close normally open contacts 186 and 187 and will open a set of normally closed contacts 188. In addition, the signals when limit switch 176 closes the second time will reset the first module 175 to its original position (if the group of wieners on the scale is within the correct weight limits) through contacts 172 and 183.

The group of wieners that were overweight or underweight will then be shifted to the second position away from the scale or position 143.

The indexer input shaft is continuously rotating and before the indexer again shifts the indexing conveyor the limit switch 176 is again closed. This time (again neglecting other components) the signal will pass through contacts 186 (which are closed) and a set of normally closed contacts 190 to the third module 191. This will cause an internal coil within module 191 to operate to close a set of normally open contacts 192 that control an external circuit as seen in FIG. 11. The switch 176 resets the module 184. This coil will also lock on the contacts 192 which will be held closed until the switch 176 again closes and resets the module 191.

After the switch 176 has been closed the third time the indexer 94 operates the conveyor and the group of wieners that are not the correct weight will be moved to the reject station. When the indexer has moved the conveyor to position so that the wieners are completely on the platform unit 152 of the reject station, a limit switch 195 will be closed by a cam 196, which is also positioned on the input shaft of the indexer unit. With switch 195 closed and also contacts 192 closed, a circuit will be completed to a suitable solenoid valve illustrated schematically at 197, which will operate and introduce pressure from a pressure source into the cylinder 155, moving the platform 152 downwardly and rejecting the group of wieners 151 on the platform.

The shift register is a standard component that is purchased from the C. P. Clare and Co., 3101 West Pratt Blvd., Chicago, Ill. The internal circuitry and operation of the shift register is more fully set out in their application Manual No. 401 dated 1962.

It will be seen that the memory circuit is constructed so that if the wieners are the correct weight a code will not appear in the first module 175 of the memory circuit when the "shift signal" switch 176 is closed just prior to moving the group of wieners having the proper weight from the scale. This is because the coil 171 will not have been energized and contacts 173 will remain open. With contacts 173 open (when the wieners are the correct weight) the first module 175 will not be energized and and this lack of signal will follow the group of wieners as it moves along the indexing conveyor. The controls for the solenoid valve 197 include contacts 192 and switch 195 in series, so that when a group of wieners of the correct weight is positioned on the reject platform 152 the module 191 will not have been energized and contacts 192 will remain open. Thus, even though the switch 195 will be closed by its associated cam during each revolution of the input shaft of the indexer, the solenoid valve will not be energized and the wieners which are the correct weight will merely be moved from the platform 152 onto the processing station when the conveyor again indexes.

Once the wieners have been rejected as either being overweight or underweight they will be intermixed with the supply on the conveyors 18 and 20 and by random choice, groups of five wieners within the allowable weight limit will eventually be processed.

It is to be understood that while this particular memory circuit has been found to be satisfactory and adequate, any other type of memory circuit can be used as well, providing that the signal for the group of wieners will follow that group of wieners until it reaches the reject station.

What is claimed is:

1. A machine for segregating a plurality of wieners into transversely aligned groups for processing, said machine including a supply of wieners, means to move said wieners into a hopper, the bottom of said hopper comprising a plurality of tracks arranged side by side and each of size to receive and support wieners extending in longitudinal direction along said tracks, means to cause said wieners to move in longitudinal direction along said tracks, means on said tracks to position said wieners so that the ends of the wieners on one track are transversely aligned with the ends of wieners on the other tracks, an indexing conveyor having a plurality of paddles each adapted to engage the ends of transversely aligned wieners on said tracks and move the wieners into separate groups, said conveyor being intermittently operated to deposit said wieners onto a processing station at the end thereof.

2. The combination as specified in claim 1 wherein said tracks are spaced apart at the ends thereof adjacent the hopper a distance greater than the diameter of the wieners being handled, and means to return wieners that drop between said tracks to said supply.

3. The combination as specified in claim 2 wherein each of said tracks is comprised of a plurality of rollers individually rotatably mounted about axes transverse to the direction of movement of said wieners.

4. A machine for handling elongated cylindrical objects into transversely aligned groups, said machine including a main frame, a hopper section mounted on said frame, means to deliver said objects to said hopper section, a plurality of tracks extending from said hopper and being downwardly inclined, said tracks being arranged side by side and each being of size to receive said objects extending in longitudinal direction along the tracks, means to vibrate said hopper and said tracks to urge said objects from said hopper downwardly along the tracks, means on said tracks to align the ends of objects on one track with the ends of objects on the other tracks to form transverse groups of objects, an indexing conveyor at the lower end of said tracks, said conveyor having a plurality of paddles each adapted to engage the ends of the objects forming one of said transverse groups and separate said group from the other objects, a scale, said conveyor placing individual groups of objects on said scale in turn, means associated with said scale for removing from said indexing conveyor groups of objects which deviate from a predetermined standard weight, and a processing station positioned to receive groups of objects of standard weight from said indexing conveyor.

5. The combination as specified in claim 4 wherein the means to deliver said objects to said hopper section includes a downwardly inclined frusto-conical surface positioned so that the objects are supported on the convex side thereof as they move to said hopper section.

6. A machine for orienting wieners into individual groups comprising a plurality of side-by-side transversely aligned weiners, said machine including a hopper section, a plurality of side-by-side tracks extending from said hopper section in a downwardly inclined direction, said tracks being of size to support weiners oriented in their longitudinal direction, means to vibrate said hopper section and said tracks, an indexing conveyor comprising a bed forming extensions on said tracks and having an endless chain mounted above said bed, a plurality of evenly spaced paddles on said chain, indexing drive means for intermittently moving said conveyor chain a distance equal to the spacing between adjacent paddles, an indexing station portion next adjacent said tracks and positioned to receive weiners from said tracks, a section of said tracks immediately rearwardly from said indexing station being hinged to move said wieners on said section below wieners on said indexing station whenever the chain of said indexing conveyor is moved, one of said paddles being adapted to engage the ends of the group of wieners on said indexing station and move the group onto a scale, means to move said hinged section of said tracks into its original position when the group of wieners previously on said indexing station is positioned on said scale, and means associated with said scale to remove any group of wieners from said indexing conveyor which deviates from a predetermined standard weight, said indexing conveyor being adapted to deposit groups of wieners not removed therefrom onto a processing station.

7. The combination as specified in claim 6 wherein means are provided to cause each paddle to move out of contact with the group of wieners it is moving along said bed during the interval when the paddle is not moving and its associated group of wieners is positioned on said scale.

8. The combination as specified in claim 7 wherein the means for delivering said wieners to said hopper section includes a downwardly inclined frusto-conical surface positioned so that the wieners are supported on the convex side thereof as they move to said hopper section.

9. The combination as specified in claim 7 wherein said means for operating said hinged section of said tracks and said means for intermittently driving said indexing conveyor are driven from a common shaft.

10. A machine for handling and arranging wieners into groups, each group comprising a plurality of transversely aligned wieners, said machine including a hopper section, means to deliver wieners to said hopper section, a plurality of tracks extending from said hopper section and being downwardly inclined, said tracks being arranged side-by-side and each being of size to receive wieners extending in longitudinal direction along the tracks, means to vibrate said hopper and said tracks to urge said wieners downwardly, the lowermost portions of said tracks being mounted to a common member and being hinged to swing from a first normal position to a second position out of the normal plane of said tracks, a stop member positioned below the normal plane of said tracks adjacent the lower end of said hinged section, the wieners on said tracks being adapted to engage said stop member and become transversely aligned against said stop member with said hinged section in said second position, means to move said hinged section between said first and second position at predetermined intervals, an indexing conveyor unit positioned at the ends of said tracks, said indexing conveyor unit comprising a bed forming extensions of said tracks and adapted to receive wieners from said tracks with the hinged section in its first position, an endless chain member mounted for movement about said bed and having a portion movable in direction parallel thereto, a plurality of evenly spaced paddles on said chain, indexing drive means to drive said conveyor chain a distance equal to the distance between adjacent paddles at regular intervals of time, said paddles being positioned to engage wieners on the bed of said conveyor, said hinged section of said tracks being moved to its second position whenever the paddles of said conveyor chain move to engage a group of wieners on said bed next adjacent said tracks, and said hinged section being moved to its first position after each paddle has engaged a group of wieners on the end of said bed adjacent said tracks, a scale having a platform comprising a section of said conveyor bed, said paddles being adapted to move groups of wieners in turn onto said scale, reject means forming a part of said bed on said conveyor, said groups of wieners being moved to said reject means subsequent to being moved onto said scale, and means associated with said scale and operative to actuate said reject means to remove any group of wieners from said conveyor which deviates from a predetermined standard weight.

11. The combination as specified in claim 10 wherein said tracks are spaced apart at the hopper end thereof a distance greater than the diameter of the wieners being handled, and means to return wieners that drop between said tracks to said delivery means.

12. The combination as specified in claim 11 and inverted V-shaped dividers extending between adjacent tracks to form said hopper section at the upper ends of said tracks.

13. The combination as specified in claim 10 wherein said stop member is comprised as a plurality of rollers individually rotatably mounted about axes transverse to the longitudinal axis of said wieners and lying in a common plane substantially normal to the plane of said tracks.

14. Apparatus for processing elongated objects of substantially uniform size comprising,
   a downwardly inclined chute having a convex upper surface,
   and a plurality of tracks having upstream ends disposed adjacent the lower end of said chute, said tracks converging at their downwstream ends, the upstream portions of said tracks being spaced apart a distance at least approximately as great as the width of said tracks to permit objects to drop between said tracks.

15. Apparatus for processing elongated objects of substantially uniform size comprising,
   a downwardly inclined frusto-conical chute having a convex upper surface, conveyor means discharging objects onto the upper end of said chute, a plurality of tracks having upstream ends disposed adjacent the lower end of said chute, said tracks converging at their downstream ends, the upstream portions of said tracks being spaced apart a distance sufficient to permit objects to drop between said tracks, and recirculating means disposed below said tracks for receiving objects dropped between said tracks and returning them to said conveyor means.

16. Apparatus for processing elongated objects of substantially uniform size comprising, a downwardly inclined chute having a convex upper surface, conveyor means discharging objects onto the upper end of said chute, a plurality of tracks having upstream ends disposed adjacent the lower end of said chute, said tracks converging at their downstream ends, the upstream portions of said tracks being spaced apart a distance at least approximately as great as the width of said tracks to permit objects to drop between said tracks, and inverted V-shaped dividers disposed between the upper ends of adjacent tracks to align said objects parallel to said tracks and guide said objects onto said tracks.

17. Apparatus for processing elongated objects of substantially uniform size comprising, a downwardly inclined chute having a convex upper surface, conveyor means discharging objects onto the upper end of said chute, a plurality of downwardly inclined tracks having upstream ends disposed adjacent the lower end of said chute, said tracks converging at their downstream ends, the upstream portions of said tracks being spaced apart a distance at least approximately as great as the width of said tracks to permit objects to drop between said tracks, means for vibrating said tracks and chute, and recirculating means disposed below said tracks for receiving objects dropped between said tracks and returning them to said conveyor means.

18. Apparatus for weighing elongated objects comprising, means for supporting objects for movement along a path, a scale having a platform forming a part of said supporting means, an endless conveyor above said supporting means having paddles projecting from it and uniformly spaced along its length, said paddles being adapted to move into engagement with said objects to move them along said supporting means, means for intermittently driving said conveyor in increments of distance equal to the distance between paddles and stopping each paddle immediately after it conveys an object onto said platform, and means adjacent the paddle immediately upstream of said platform for moving said paddle away from said object as it is being weighed.

19. Apparatus for weighing elongated objects comprising, means for supporting objects for movement along a path, a scale having a platform forming a part of said supporting means, means for intermittently conveying said objects along said supporting means in increments of distance slightly greater than the length of said objects, reject means in said path of movement and located at least one increment of distance downstream of said scale, and electrical means interconnecting said scale and reject means to effect the rejection of objects not conforming to a predetermined weight range, said electrical means including stepping means delaying the operation of said reject means until said objects move from said scale to said reject means.

20. Apparatus for processing elongated objects of substantially uniform length comprising, a chute for receiving a randomly oriented supply of said objects, a plurality of tracks having upstream ends disposed adjacent the downstream end of said chute, the upstream portions of said tracks being spaced apart a distance sufficient to permit objects to drop between said tracks, positioning means cooperating with said tracks such that a plurality of said elongated objects may be transversely aligned into groups on said tracks, support means for supporting said elongated objects for movement along a path after said objects have been transversely aligned, conveyor means having a plurality of paddles projecting therefrom, said paddles being positioned for movement into engagement with said objects to move said objects along said support means in separate groups of transversely aligned objects, a scale having a platform forming a part of said support means, disengagement means for moving said paddle temporarily away from said transversely aligned groups of elongated objects when said groups reach said platform, intermittent drive means for intermittently driving said conveyor means such that each of said groups is moved along said support means intermittently, and reject means for rejecting said transversely aligned groups not conforming to a preselected range of weight.

References Cited by the Examiner
UNITED STATES PATENTS

| | | | |
|---|---|---|---|
| 1,714,131 | 5/1929 | McHugh | 198—135 X |
| 2,112,259 | 3/1938 | Wyland | 209—121 |
| 2,829,476 | 4/1958 | Engleson | 198—30 X |
| 2,849,116 | 8/1958 | Fried | 209—121 |
| 2,964,182 | 12/1960 | Spurlin | 209—83 X |
| 3,110,388 | 11/1963 | Elliott | 198—43 |
| 3,153,992 | 10/1964 | Dabelle | 193—2 X |
| 3,182,785 | 5/1965 | Tourtellotte | 198—127 |

M. HENSON WOOD, JR., *Primary Examiner.*

J. N. ERLICH, *Assistant Examiner.*